(12) United States Patent
Hadef

(10) Patent No.: US 9,291,716 B2
(45) Date of Patent: Mar. 22, 2016

(54) METHOD AND APPARATUS FOR DETERMINING PHYSICAL CHARACTERISTICS OF A RECEIVING DEVICE IN A NAVIGATION SYSTEM

(71) Applicant: Samsung Electronics Co., Ltd., Gyeonggi-do (KR)

(72) Inventor: Mahmoud Hadef, Middlesex (GB)

(73) Assignee: Samsung Electronics Co., Ltd (KR)

( * ) Notice: Subject to any disclaimer, the term of this patent is extended or adjusted under 35 U.S.C. 154(b) by 522 days.

(21) Appl. No.: 13/761,643

(22) Filed: Feb. 7, 2013

(65) Prior Publication Data

US 2013/0201055 A1    Aug. 8, 2013

(30) Foreign Application Priority Data

Feb. 8, 2012 (RU) ................................ 2012104318
Jul. 31, 2012 (GB) ................................... 1213603.2

(51) Int. Cl.
*G01S 19/33* (2010.01)
*G01S 19/23* (2010.01)
*G01S 19/36* (2010.01)
*G01S 19/42* (2010.01)

(52) U.S. Cl.
CPC ................ *G01S 19/33* (2013.01); *G01S 19/23* (2013.01); *G01S 19/36* (2013.01); *G01S 19/42* (2013.01); *G01S 19/425* (2013.01)

(58) Field of Classification Search
CPC ........ G01S 19/22; G01S 19/23; G01S 19/235
USPC ............. 342/357.21, 357.25, 357.61, 357.62; 701/468, 478.5; 455/63.1, 65
See application file for complete search history.

(56) References Cited

U.S. PATENT DOCUMENTS 5,831,576 A    11/1998 Sheynblat
6,847,325 B2    1/2005 Kim
(Continued)

FOREIGN PATENT DOCUMENTS

KR    1020020052438    7/2002
WO    WO 03/023440    3/2003
(Continued)

OTHER PUBLICATIONS

P.B. Ober, "Integrity Monitoring: Information Paper", TVS Memorandum No. REP9606B, Telecommunication and Traffic-Control Systems—TVS, Jun. 1996.
(Continued)

*Primary Examiner* — Dao Phan
(74) *Attorney, Agent, or Firm* — The Farrell Law Firm, P.C.

(57) ABSTRACT

A method and apparatus are presented for improving accuracy in a navigation system. A method of determining a physical characteristic of a receiving device in a navigation system, includes receiving a plurality of navigation signals from a plurality of navigation signal sources, respectively; determining a plurality of measurement estimates, based on the received navigation signals; and determining a physical characteristic of the receiving device by estimating a first set of one or more parameters in an error model, based on at least the plurality of measurement estimates. The error model includes a first error contribution for modeling noise and a second error contribution for modeling indirect signal propagation of the plurality of navigation signals.

30 Claims, 4 Drawing Sheets

(56) References Cited

U.S. PATENT DOCUMENTS

| | | | | |
|---|---|---|---|---|
| 7,860,617 | B1* | 12/2010 | Gaylor et al. | 701/13 |
| 2012/0127029 | A1* | 5/2012 | Rachlin et al. | 342/357.23 |
| 2014/0045518 | A1* | 2/2014 | Sathyan et al. | 455/456.1 |

FOREIGN PATENT DOCUMENTS

| | | |
|---|---|---|
| WO | WO 03/029915 | 4/2003 |
| WO | WO 2008/156909 | 12/2008 |
| WO | WO 2012/071320 | 5/2012 |

OTHER PUBLICATIONS

R. Grover Brown, "Receiver Autonomous Integrity Monitoring" in Global Positioning System: Theory and Applications vol. 2, 1996.

Todd Walter et al., "Weighted RAIM for Precision Approach", Standford University, 1995.

UK Search Report dated Nov. 28, 2012 issued in counterpart application No. 1213603.2.

* cited by examiner

METHOD AND APPARATUS FOR DETERMINING PHYSICAL CHARACTERISTICS OF A RECEIVING DEVICE IN A NAVIGATION SYSTEM

PRIORITY

This application claims priority under 35 U.S.C. §119(a) to Russian Patent Application Serial No. 2012104318, which was filed in the Russian Patent Office on Feb. 8, 2012, and to Great Britain Patent Application Serial No. 1213603.2, which was filed in the Great Britain Intellectual Property Office on Jul. 31, 2012, the entire disclosure of each of which is incorporated herein by reference.

BACKGROUND OF THE INVENTION

1. Field of the Invention

The present invention relates generally to navigation systems, e.g., Global Navigation Satellite Systems (GNSSs), and in particular, a method and apparatus for improving the accuracy of physical characteristic calculations, e.g., position, velocity, and/or time accuracy, for a user using a navigation system.

2. Description of the Related Art

Satellite navigation technology is used in a variety of electronic devices. For example, many mobile telephones have some form of integrated location system that works with one or more GNSS, such as a GLObalnaya NAvigatsionnaya Sputnikovaya Sistema (GLONASS) or a Global Positioning System (GPS). Additionally, in car navigation systems are used to determine the velocity of a vehicle for tracking and monitoring purposes.

Taking GPS as an example, which operates with 24 orbiting satellites, for civilian purposes, each satellite outputs a navigation or location signal on a first channel L1 at 1575.42 MHz. The signal carries a Coarse-grained Acquisition (C/A) code. The C/A code is modulated and repeated on the L1 wave every millisecond and contains the time the code was transmitted, based on an atomic clock onboard the satellite.

A civilian GPS receiver receives the C/A code from a satellite and compares it with a replica signal generated by the receiver using a receiver clock. From this comparison, a time difference between the satellite's atomic clock and the receiver clock is determined. The time difference is then multiplied by a known value for the speed of light to determine a distance between the GPS receiver and the satellite. This distance measurement is referred to as pseudorange measurement because it will contain inherent inaccuracies, e.g., due to timing errors, atmospheric conditions, measurement errors etc.

Using the pseudorange measurements for a plurality of satellites, together with the calculated positions of these satellites, a location in a number of dimensions can be calculated. For example, by using three satellites, a user's location in two dimensions can be calculated; by using four satellites, a user's location in three dimensions can be calculated. The additional satellite in each case is used to determine a timing correction. The positions of each of these satellites at the time the original C/A code was transmitted can be determined using orbit parameters (sometimes referred to as "ephemeris") and/or almanac data broadcast by the satellites. From this information, a satellite coordinate (X,Y,Z) can be computed.

Several solutions have been proposed to increase the accuracy and/or integrity of location information provided by satellite location systems. One of these solutions is referred to as Receiver Autonomous Integrity Monitoring (RAIM). A solution of this form may use a weight in relation to the measurements to prefer satellites that are positioned over a receiving device rather than at an obtuse angle to the receiving device. For example, satellites that are nearer the horizon in relation to a receiving device positioned on the Earth's surface are likely to suffer from greater errors, and therefore, their contribution may be reduced with appropriate weighting factors. This approach is described in a publication by T. Walter and P. Enge, which is entitled "Weighted RAIM for Precision Approach," Proceedings of ION-GPS 95, Palm Springs, Calif., Sep. 12-15, 1995 and in U.S. Pat. No. 5,831, 576, which is entitled "Integrity Monitoring of Location and VELOCITY coordinates from Differential Satellite Positioning Systems Signals".

In these documents possible large errors in pseudorange measurements are detected by comparing a cost function F to a threshold $h_F$, wherein if the cost function is greater than the threshold, i.e., $F > h_F$, for one or more particular satellites, measurement values for those satellites are not used or are modified. The cost function F is typically based on position errors for one or more satellites after a location has been calculated, e.g., may be based on the pseudorange residual values. If the cost function relates to more than one satellite, a weighted sum of the squared residuals may be used. In the publications described above, the threshold $h_F$ is based on a false alarm probability.

Other examples of integrity monitoring are also described by P. B. Ober in "Integrity Monitoring: Information paper" TVS Memorandum No. REP9606B, June, 1996, by R. G. Brown in "Receiver Autonomous Integrity Monitoring", in Global Positioning System: Theory and applications Volume 2, eds. B. W. Parkinson and J. J. Spilker Jr., American Institute of Aeronautics and Astronautics, 1996, and in U.S. Pat. No. 6,134,484, which is entitled "Method and Apparatus for Maintaining the Integrity of Spacecraft Based Time Position Using GPS".

Another solution for improving accuracy is described in U.S. Pat. No. 5,808,581, which is entitled "Fault Detection and Exclusion Method for Navigation Satellite Receivers", and looks for erroneous pseudorange steps by predicting changes in pseudoranges from one measurement to the next. U.S. Pat. No. 5,808,581 proposes to compare directly obtained pseudorange residuals and pseudorange residuals obtained after filtering the achieved decision by a Kalman filter. If the difference of the two pseudorange residual value exceeds a threshold, pseudorange measurements for a satellite are excluded from the decision.

However, there is still a problem of improving accuracy in navigation systems. That is, while solutions have been presented for dedicated navigation use, e.g., in aircraft, ships, or for tracking, these solutions are limited for consumer GNSS applications.

Further, conventional solutions typically involve rejecting satellite measurements that contain large errors. These techniques improve accuracy when the number of "erroneous" satellites is no more than one. However, if the number of "erroneous" satellites is greater than one, these methods become inefficient. Further, when the number of "erroneous" satellites equals half the total number of satellites, these methods produce incorrect results.

SUMMARY OF THE INVENTION

Accordingly, the present invention is designed to address at least the problems and/or disadvantages described above and to provide at least the advantages described below.

An aspect of the present invention is to provide a robust location method that can accommodate multiple location signal sources with large error factors.

Another aspect of the present invention is to provide a solution suitable for use in improving accuracy in environments commonly inhabited by users of modern electronic devices that have integrated navigation systems, such as mobile telephones.

In accordance with an aspect of the present invention, a method is provided for determining a physical characteristic of a receiving device in a navigation system. The method includes receiving a plurality of navigation signals from a plurality of navigation signal sources, respectively; determining a plurality of measurement estimates, based on the received navigation signals; and determining a physical characteristic of the receiving device by estimating a first set of one or more parameters in an error model, based on at least the plurality of measurement estimates. The error model includes a first error contribution for modeling noise and a second error contribution for modeling indirect signal propagation of the plurality of navigation signals.

In accordance with another aspect of the present invention, a receiving device is provided for use in a navigation system. The receiving device includes a receiver for receiving a plurality of navigation signals from a plurality of navigation signal sources, respectively; a measurement estimator for determining a plurality of measurement estimates based on the received navigation signals; and a physical characteristic estimator for determining a physical characteristic of the receiving device.

The physical characteristic estimator estimates a first set of one or more parameters in an error model based on at least the plurality of measurement estimates. The error model includes a first error contribution for modeling noise and a second error contribution for modeling indirect signal propagation of the plurality of navigation signals.

In accordance with another aspect of the present invention, a server is provided for determining a physical characteristic of a receiving device. The server includes a physical characteristic estimator for determining the physical characteristic of the receiving device by estimating a first set of one or more parameters in an error model, based on at least a plurality of measurements estimated from navigation signals from a plurality of navigation signal sources. The error model includes a first error contribution for modeling noise and a second error contribution for modeling indirect signal propagation of the plurality of navigation signals.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Figure 1:
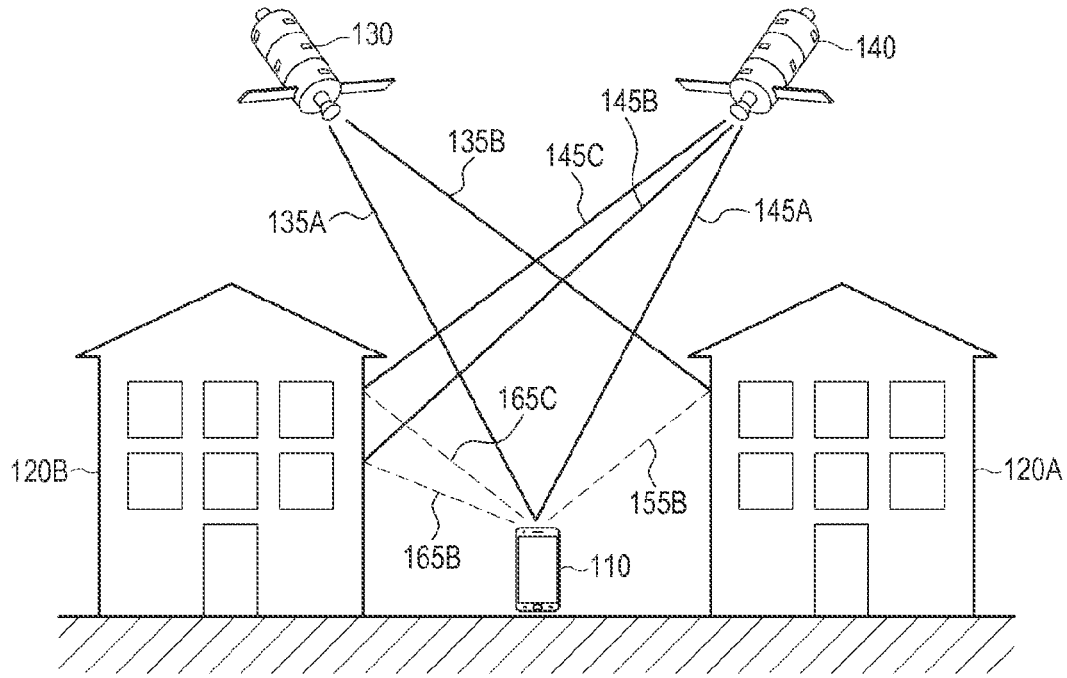
FIG. 1 illustrates multipath effects in an urban environment.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method and apparatus are presented for improving accuracy in a navigation system, which uses an error model for estimating a physical characteristic of a receiving device. The error model has a first term that models noise and a second term that models indirect signal propagation. For example, the first term may be modeled by a Gaussian distribution and the second term may be modeled by an exponential distribution. By maximizing the likelihood of observed data, given a number of known error model parameters, a number of unknown model parameters can be found. These unknown model parameters can provide, for example, a more accurate location, velocity, or time estimate for a receiving device. The method and apparatus can be used in global satellite navigation systems such as a GPS.

Certain embodiments described herein relate to navigation systems. In these systems one or more physical characteristics of a receiving device may be determined. For example, one or more of position, velocity, and time information relating to a receiving device may be obtained. For example, the position information may be the position of the receiving device, the velocity information may be the velocity of the receiving device, and the time information may be a clock bias and/or an accurate time of receipt for the receiving device. A system that determines the position of a receiving device may be referred to herein as "a location system," as a location of the receiving device is determined.

A pseudorange value, pr, is typically modeled as shown in Equation (1).

$$pr = (T_R - T_S)*c \qquad (1)$$

In Equation (1), $T_R$ is a time according to a receiver clock, when the signal was received, $T_S$ is a time of the transmission according to a satellite's atomic clock, and c is the speed of light in a vacuum. If each time T is considered to consist of the true receive or transmit time plus a clock bias $\tau$ (tau), so that $T_R = t_R + \tau_R$ and $T_S = t_S + \tau_S$, then Equation (1) can be re-written as Equation (2).

$$pr = ((t_R - \tau_R) - (t_S + \tau_S))*c \qquad (2)$$
$$= (t_R - t_S)*c + c*\tau_R - c*\tau_S,$$

In Equation (2), $(t_R-t_S)*c$ is a range from the receiver at receive time to the satellite at transmit time, $c*\tau_R$ is an error due to a clock bias at the receiver, and $c*\tau_S$ is an error due to a clock bias at the satellite. As each satellite has an atomic clock, $\tau_S$ is often small, making the error due to a clock bias at the satellite negligible. Using Pythagoras Theorem in three dimensions the true distance can be calculated using Equation (3).

$$(t_R-t_S)*c=((x_S(t_S)-x_R(t_R))^2+(y_S(t_S)-y_R(t_R))^2+(z_S(t_S)-z_R(t_R))^2)^{1/2} \quad (3)$$

In Equation (3), $(x_R(t_R), y_R(t_R), z_R(t_R))$ is the position of the receiver in three-dimensional space at the time of reception $t_R$ and $(x_S(t_S), y_S(t_S), z_S(t_S))$ is the position of the satellite in three-dimensional space at the time of transmission $t_S$. The latter position is typically known from orbit parameters (ephemeris) and almanac data broadcast by the satellite. Hence, there are four unknown parameters $x_R(t_R)$, $y_R(t_R)$, $z_R(t_R)$ and $T_R$.

By using signals from four satellites the parameters $x_R(t_R)$, $y_R(t_R)$, $z_R(t_R)$ and $T_R$ can be calculated. For example, there are four sets of variables relating to each satellite and a set of unknown variables:

$$pr_1=((x_{S1}-x)^2+(y_{S1}-y)^2+(z_{S1}-z)^2)^{1/2}+c*\tau-c*\tau_{S1}$$

$$pr_2=((x_{S2}-x)^2+(y_{S2}-y)^2+(z_{S2}-z)^2)^{1/2}+c*\tau-c*\tau_{S2}$$

$$pr_3=((x_{S3}-x)^2+(y_{S3}-y)^2+(z_{S3}-z)^2)^{1/2}+c*\tau-c*\tau_{S3}$$

$$pr_4=((x_{S4}-x)^2+(y_{S4}-y)^2+(z_{S4}-z)^2)^{1/2}+c*\tau-c*\tau_{S4},$$

where x, y, z, and $\tau$ are the unknown position and bias of the receiver.

Similar calculations can also be used to determine the velocity of a receiving device, where instead of pseudoranges, pseudodoppler values are calculated. The values may represent pseudo Doppler frequencies or frequency shifts for each of satellites, e.g., the frequency of the received signal minus the frequency of the emitted navigation signal. Then using known position, velocity, and signal frequency values for each of the satellites, a velocity estimate for the receiving device can be determined. For example, the observed frequency of a signal at the receiver $f_R$ can be calculated using Equation (4).

$$f_R=((c^+ - v_R)/(c^- + v_S))*f_S \quad (4)$$

In Equation (4), c is the speed of light in a vacuum, $v_R$ is the velocity of the receiving device (positive if the receiving device is moving towards the satellite), $v_S$ is the velocity of the satellite (positive if the satellite is moving away from the receiving device), and $f_S$ is the frequency of the emitted signal.

Most positioning methods use the least means squares method to solve the above equations and determine the position of a receiving device. This method assumes that the actual observation can be written as the sum of a modeled observation and an error term, as shown in Equation (5).

$$P=Gx+n \quad (5)$$

In Equation (5), P is a vector representing the calculated pseudoranges, G is a matrix representing the observed variables from the satellites, x is an unknown vector representing the receiver variables to be determined, and n is a vector representing a noise factor. As is known in the art, one solution using the LSM is shown in Equation (6)

$$x'=(G^TG)^{-1}G^TP \quad (6)$$

The least means squares method is widely used in the art to calculate a receiver position. It may be extended to calculate time and/or velocity values. Its efficiency and wide usage is explained by relatively simple implementation and optimality when the noise factor is assumed to conform to a Gaussian probability distribution. In this case, the least means squares method produces a result with a minimized variance.

Portable electronic devices including a GNSS receiving device are often used within an urban environment. In urban environments there is a problem of multipath effects when signals are reflected from urban obstacles such as tall buildings. As a result, some signals from a GNSS satellite will be received directly from the satellite and other signals will be received following one or more reflections from nearby obstacles, i.e., indirectly from the satellite. If reflection occurs, then there will be additional measurement error due to additional signal delay for the reflected signals. This delay measurement error results in degradation of estimated user position accuracy when using conventional location estimation techniques.

FIG. 1 illustrates multipath effects in an urban environment.

Referring to FIG. 1, a user carries a mobile telephone 110 with GPS functionality. The mobile telephone 110 acts as a GPS receiving device and receives signals from GPS satellites 130 and 140. GPS satellite 130 transmits two signals 135A and 135B, which may be two separate signals or one signal at different times. The signal 135A is received by the mobile telephone 110 directly and therefore, suffers no multipath propagation effects. However, the signal 135B is reflects off building 120A and the mobile telephone 110 actually receives a reflected signal 155B.

The signal path including the signal 135B and the reflected signal 155B is longer than the path of the signal 135A. Consequently, a different location measurement being made for the signal 135B than for the signal 135A, even though the mobile telephone 110 is in the same location. A similar effect is shown for satellite 140, wherein a signal 145A is received directly and signals 145B and 145C are reflected from building 120B, before receipt in the form of reflected signals 165B and 165C.

In FIG. 1, there are major measurement errors that affect the accuracy of location methods. In this case, the error distribution for location errors does not conform to a Gaussian probability distribution, and therefore, the least mean squares method for determining location co-ordinates for a receiving device is sub-optimal, i.e., is of a greatly reduced efficiency.

Urban environments may result in two or more, or even half, of the satellites in a GNSS giving erroneous pseudorange values. For example, the two satellites 130 and 140 in FIG. 1 may be two out of four total satellites for locating a receiving device. In this case, if the receiving device were to receive reflected signal 155B from the satellite 130 and reflected signal 165B from the satellite 140, both of the received signals will result in significant pseudorange errors.

Pseudodoppler errors will also affect the accuracy of velocity estimates for the mobile device. As described previously, many well-known methods become inefficient when the number of erroneous satellites is greater than or equal to two and produce incorrect results when at least half the satellites provide incorrect pseudorange measurements. This can lead to significant problems for location in an urban environment.

Certain embodiments of the present invention provide a robust Position, Velocity, and/or Time (PVT) estimation methods that accommodate multipath errors based on an accurate statistic model of measurement errors, such as pseudorange or pseudodoppler errors. These embodiments can accurately locate a receiving device in situations where multiple location signal sources have significant error contributions, e.g., for urban environments with multipath effects.

Additionally, certain embodiments of the present invention provide navigation methods wherein a complex error model is used that includes a first error contribution modeled by a Gaussian probability distribution and a second error contribution modeled by an exponential distribution, wherein the second error contribution modeling a multipath propagation effect. The first error contribution models noise, and the second error contribution models indirect signal propagation such as multipath effects. Alternatively, distributions other than the Gaussian and exponential distributions may be used to model these error contributions.

Figure 2:
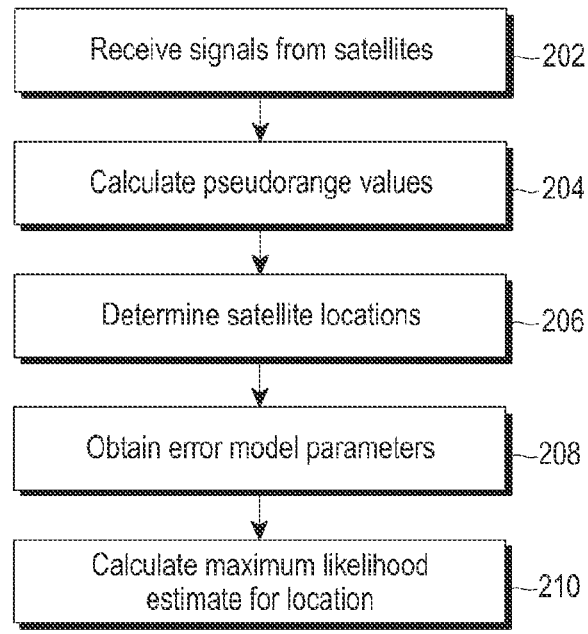
FIG. 2 is a flow diagram illustrating a location method according to an embodiment of the present invention.

FIG. 2 is a flow diagram illustrating a location method according to an embodiment of the present invention. The method in FIG. 2 may be performed by a receiving device, by a remote server in communication with the receiving device, or by a combination of remote processing on a remote server and local processing on the receiving device.

Referring to FIG. 2, in step 202, a number of signals are received from location signal sources, e.g., GNSS satellites, territorial radio frequency transmitters, etc.

As described in the background, each satellite transmits a location signal encoding broadcast data. FIG. 2, will be described from the perspective of a location in three-dimensional space. Therefore, signals will be received from four separate satellites. However, the present invention is not limited to this configuration.

After each signal is received in step 202, a pseudorange value for each satellite is determined in step 204. As described above, a pseudorange value may be determined by comparing the received signal to a local version of the signal and determining a time delay between the two. The time delay may then be multiplied by the speed of light in a vacuum 'c') to determine a pseudorange value, i.e., an estimate of the range or distance between the satellite that transmitted the signal and the receiving device. Hence, in the present example, because signals are received from four separate satellites, following step 204, there will be four pseudorange estimates from each of the four satellites.

In step 206, the location of each satellite in three-dimensional space is determined, e.g., $\vec{R}_i(X_i, Y_i, Z_i)$ for satellite i is determined. The location of each satellite may be determined using orbit parameters forming part of ephemeris data and/or almanac data, which may be broadcast by the satellites, e.g., the data may be encoded in each received signal.

Alternatively, the data may be received from an external source, such as a remote database that contains estimates for satellite positions at a particular time or territorial radio transmissions.

In step 208, a number of parameter values for an error model are retrieved. The error model is constructed to model the error between a calculated location coordinate and/or clock bias for the receiving device and an actual location coordinate and/or clock bias for the receiving device. The error model models the error as the sum of an error term modeled using a Gaussian probability distribution (i.e., normally distributed) and an error term that models indirect signal propagation such as multipath effects.

In the present example, the indirect signal propagation error term is modeled using an exponential probability distribution. Therefore, the retrieved error model parameters include a mean and a variance value for the Gaussian probability distribution and at least one parameter (often referred to as a 'rate parameter') for the exponential probability distribution. In multi-dimension probability distributions, these parameters may have a vector or matrix form.

As will be described later with reference to other embodiments, the parameter values for the error model may be retrieved from a remote database based on a rough or initial and imprecise location estimate and signal receipt time for the receiving device. Alternatively, the parameters values may be retrieved from a local database on the receiving device and/or looked up by a remote server.

In the present example, the error model includes an evaluation of the error for each satellite and these evaluations are summed. Possible error models are described in more detail below with reference to the other embodiments below.

In step 210, a three-dimensional location coordinate for the receiving device is calculated by using Maximum Likelihood Estimation (MLE) methods on a function defined by the error model. Any search algorithm or numerical method that searches the parameter space of the error model to determine a (global) maximum of the function may be used, such as gradient descent or other iterative search methods. Examples of numerical optimization techniques, such as Newton techniques, are described by G. Korn and T. Korn in Handbook of Mathematics, M: Nauka, 1978, p. 832, and the Nelder-Mead method is described by D. Himmelblau in Applied Non-linear Programming. M: Mir, 1975, p. 535.

The natural logarithm of the function may also be taken, possibly normalized by a maximum amplitude of the function, and solved for the three coordinate and clock bias parameters. For example, parameters for the receiving device coordinate vector $\vec{r}_0 = (x_0, y_0, z_0)$ and clock bias $\tau_0$ that maximize the likelihood of the observed data using the error model may be determined.

The resultant location for the receiving device (i.e., $\vec{r}_0 = (x_0, y_0, z_0)$) calculated according to this method is of a greater accuracy than by the conventional least mean squares methods and can accommodate multipath effects occurring on any number of location signals. This method determines the location of a receiving device in urban environments where conventional methods at the very least fail to give an accurate location and, in a worst-case scenario, actually give an erroneous location result.

Figure 3:
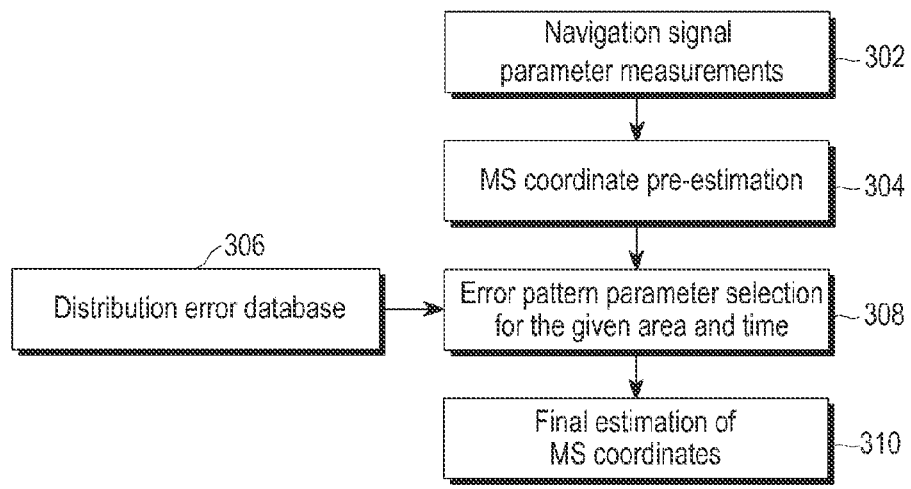
FIG. 3 is a flow diagram illustrating a location method according to an embodiment of the present invention.

FIG. 3 is a flow diagram illustrating a location method according to an embodiment of the present invention. Specifically, FIG. 3 illustrates a variation of the embodiment illustrated in FIG. 2, wherein error model parameters are retrieved from a database based on a preliminary location estimate for the receiving device. This is based on the observation that different areas at different times may have different location signal distribution parameters.

Referring to FIG. 3, in step 302, navigation signal parameter measurements are made, similar to steps 202, 204, and 206 of FIG. 2. In step 304, a rough or preliminary location estimate for the receiving device is calculated. For example, this may be performed using known location methods such as the least mean squares method. This produces a reduced-accuracy location estimate, e.g., a result including errors due to multipath propagation effects, as described above.

In step 306, the preliminary location and a time of receipt for the location signals at the receiving device is sent to a distribution error database, which includes a database of error model parameter distributions across an area and/or time. In step 308, the database returns parameter values of the Gaussian and exponential probability distributions that are stored in the database as a function of at least a two or three-dimensional coordinate and a time value. A method of generating the database will be described in more detail below with reference to FIG. 5.

For example, an area of operation may be segmented into sub-areas, wherein if a preliminary x and y coordinate of the receiving device falls within a sub-area, an error parameter distribution or distributions for the sub-area are retrieved. The time value may then be used to look up a particular error parameter value or set of values at the location signal receipt time in the sub-area.

Alternatively, the time and/or preliminary location may modulate a set of retrieved parameters based on a time and/or location based function. Error parameters may be selected for a particular location signal, i.e., a signal from a particular satellite, wherein measurements or signal characteristics such as Signal-to-Noise Ratio (SNR) and/or elevation angle of the satellite are used to select or further select appropriate error model parameter values. In this implementation, the measurements, such as the SNR and/or elevation angle of the satellite may be selected based on the preliminary location of the receiving device and time of location signal receipt, and then the error model parameter values may be retrieved based on the measurements. This may offer a more compact database, as only measurements for a sub-area and/or time are stored, rather than a separate function or look-up table of error model parameter values. The received location signals may be sorted according to the measurements to retrieve the error model parameter values.

In step 310, following the retrieval of error model parameters based on the given area and time in step 308, a final estimation of the location of the receiving device is performed. This final estimation may be performed according to step 210 of FIG. 2, i.e., using MLE methods to determine location parameter values that maximize the likelihood of the observed data as embodied in the error model. For example, a function may be plotted, and from the maximum of the function, a clarified user position is determined. The function may be iteratively maximized in one dimension at a time, or in multi-dimensional space. As described previously, MLE methods have the advantages of efficiency and simple implementation.

The properties of an exemplary error model will now be described in more detail. The discussion below presents a preferred error model, however, other error models are possible and there may be variation in the form of the error model for each implementation, for example depending on the location system used.

If it is assumed that pseudorange measurement errors are independent, then the likelihood function can be written as shown in Equation (7).

$$W(\vec{r}, \tau) = \prod_{i=1}^{N_{SV}} W_i(prn_i + \tau \cdot c - |\vec{R}_i - \vec{r}|) \quad (7)$$

In Equation (7), $W(\vec{r},\tau)$ is a function of r, the location coordinate of the receiving device in x, y, z space, and $\tau$ the clock bias of the receiving device, i.e., the mismatch between the time scales of the GNSS and the receiving device; $prn_i$ is a pseudorange value for satellite i; c is the speed of light in a vacuum; $\vec{R}=(X_i,Y_i,Z_i)$ is the location of satellite i; and $N_{SV}$ is the number of signal sources (where SV stands for Space Vehicles).

MLE methods search for a maximum (or maxima) for the function $W(\vec{r},\tau)$. The maximum enables r to be calculated resulting in the position of the receiving device without a priori knowledge about position distribution of the receiving device. The use of the maximum likelihood technique supposes that the pseudorange measurement error distribution probability density is known.

As previously discussed, most conventional methods specify the Gaussian character of pseudorange measurement errors. In urban environments, an error caused by indirect satellite signal propagation occurs. Accordingly, embodiments of the present invention use a complex error pattern. In the present example, the complex error pattern defines a complex error that is the sum of a Gaussian distribution error and an exponential distribution error $\epsilon_i$, as shown in Equation (8).

$$\xi_i = \epsilon_i + n_i \quad (8)$$

In Equation (8), $\xi_i$ is a pseudorange measurement error and $n_i$ is an error with a Gaussian probability distribution, e.g., in one dimension.

$$W_n(x) = \frac{1}{\sqrt{2\pi}\,\sigma} \exp\left(-\frac{(x-m)^2}{2\sigma^2}\right) \quad (9)$$

In Equation (9), m is a mean value and $\sigma^2$ is a variance value, and $\epsilon_i$ is an error with an exponential distribution, e.g., in one dimension.

$$W_\epsilon(x) = \lambda \exp(-\lambda x) \quad (10)$$

In Equation (10), $\lambda$ is a rate parameter.

By referring to $W_n(X)$ and $W_\epsilon(X)$ in Equations (9) and (10), combining the two exemplary one-dimension probability distributions enables the pseudorange measurement error distribution probability density to be written as shown in Equation (11).

$$W_\xi(x) = \lambda \exp[-(x-m)\lambda]\exp\left[\frac{\sigma^2\lambda^2}{2}\right]\Phi\left[\frac{x}{\sigma}-\sigma\lambda-\frac{m}{\sigma}\right] \quad (11)$$

In Equation (11), $$\Phi(x) = \frac{1}{\sqrt{2\pi}} \int_{-\infty}^{x} e^{-\frac{t^2}{2}}\,dt$$

is the probability integral or Cumulative Distribution Function (CDF).

As a time difference between a receiving device clock and the system or atomic clock of the satellites is unknown, it may be difficult to directly obtain the pseudorange measurement error $\xi_i$. However, practically, it is possible to compute the pseudorange measurement error difference distribution making use of a difference calculation, for example a difference between error for several satellites, as shown below in Equation (12).

$$x = \xi_i - \xi_j = \epsilon_i - \epsilon_j + n \quad (12)$$

In Equation (12):

$\epsilon_i$—is a random value exponentially distributed by the parameter $\lambda_i$;

$\epsilon_j$—is a random value exponentially distributed by the parameter $\lambda_j$; and n—a random value distributed by the Gaussian rule with mean in and variance $\sigma^2$.

Using this modification, the pseudorange measurement error distribution can be written as shown in Equation (13).

$$W_{i,j}(x, \lambda_i, \lambda_j, m, \sigma) = \tag{13}$$
$$\frac{\lambda_i \lambda_j}{\lambda_j + \lambda_i} \exp\left[-(x-m)\lambda_j + \frac{\sigma^2 \lambda_j^2}{2}\right] \Phi\left(\frac{x-m}{\sigma} - \sigma\lambda_j\right) +$$
$$\frac{\lambda_i \lambda_j}{\lambda_j + \lambda_i} \exp\left[(x-m)\lambda_i + \frac{\sigma^2 \lambda_i^2}{2}\right] \Phi\left(-\frac{x-m}{\sigma} - \sigma\lambda_i\right)$$

According to the MLE methods, the pseudorange measurement error distribution is maximized based on known parameters $\lambda_i$, $\lambda_j$, m, and $\sigma^2$ so as to estimate unknown parameters, i.e., a coordinate for the receiving device, from $\xi_i$, as shown in Equation (14).

$$W(\lambda_i, \lambda_j, m, \sigma) = \prod_{k=1}^{K} W_{i,j}(\xi_k, \lambda_i, \lambda_j, m, \sigma) \tag{14}$$

In Equation (14), K is the number of implementations, e.g., the number of different signal sources.

Figure 4:
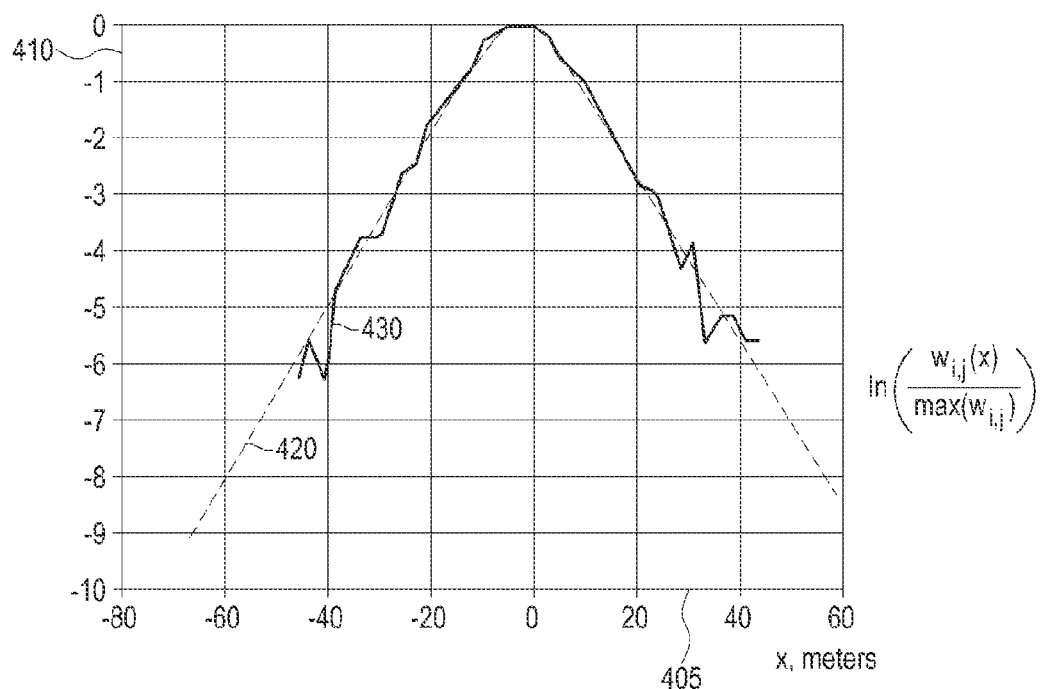
FIG. 4 is a chart illustrating an exemplary error function and observed error data in a location method according to an embodiment of the present invention.

FIG. 4 is a chart illustrating an exemplary error function and observed error data in a location method according to an embodiment of the present invention. More specifically, for ease of illustration and explanation, FIG. 4 illustrates a maximum for a one-dimensional case. As the natural logarithm function is monotonic, maximizing the natural logarithm of the pseudorange measurement error distribution results in the same unknown parameter set as maximizing the pseudorange measurement error distribution directly.

In FIG. 4 the function has also been normalized by dividing by the maximum amplitude of the function, i.e., by max($W_{i,j}$). The x-axis 405 and y-axis 410 plot the modeled function 420 together with histogram data representing residual errors 430. As can be seen from FIG. 4, the error model is a good match for the observed error distribution.

In other implementations, a single parameter value for each signal's exponential distribution may be used in which case maximizing the likelihood becomes equivalent to maximizing an exemplary cost function, as shown in Equation (15).

$$C(\vec{r}, \tau) = \sum_{i=1}^{N} \ln W_i(prn_i + \tau \cdot c - |\vec{R}_i - \vec{r}|) \tag{15}$$

In Equation (15), $$W_i(u) = \lambda_i \exp[-(u - m_i)\lambda_i] \exp\left[\frac{\sigma_i^2 \lambda_i^2}{2}\right] \Phi\left[\frac{u}{\sigma_i} - \sigma_i \lambda_i - \frac{m_i}{\sigma_i}\right],$$

and N is the number of signal sources. In this case, each signal has its own set of error model parameters. This is also possible for the case above.

The known parameters, e.g., $\lambda_i$, $\lambda_j$, m, and $\sigma^2$ for all signals or a set of signals with a specific characteristic, can be determined experimentally.

In certain implementations, the pseudorange measurement error distribution parameters differ for different location signal sources. For example, the pseudorange measurement error distribution parameters may be determined by measurement noise and signal propagation in a particular environment, e.g., an environment with a particular presence of indirect propagation and particular multipath effects. Hence, when forming one or more databases of error model parameters, the parameters may be grouped using one or more location signal propagation characteristics. These one or more location signal propagation characteristics may be recorded for a particular sub-area and/or time so that they may be retrieved based on at least a preliminary location estimate for retrieving known error model parameters. Thereafter, error model parameters may be retrieved based on the one or more location signal propagation characteristics. For example, for satellite navigation systems, location signals can be grouped by the satellite elevation angle and SNR.

Figure 5:
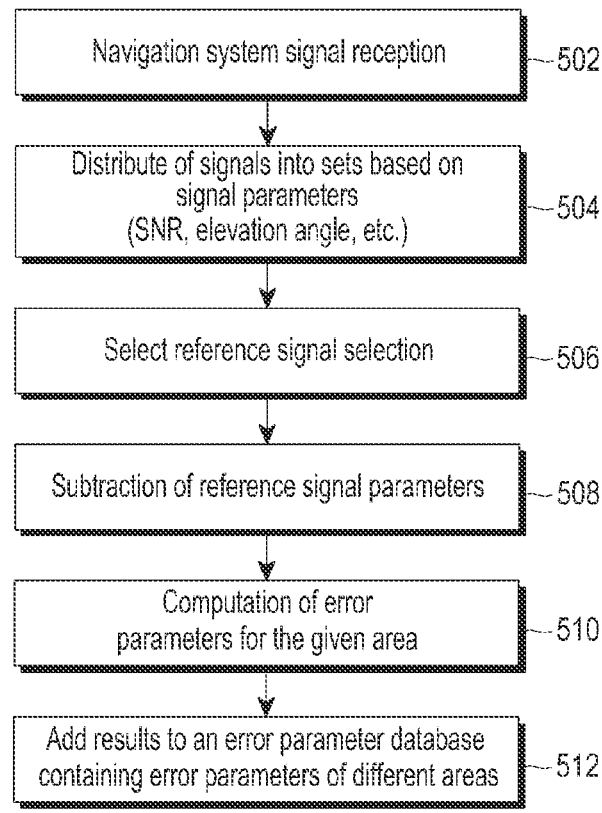
FIG. 5 is a flow diagram illustrating a method of determining error model parameters according to an embodiment of the present invention.

FIG. 5 is a flow diagram illustrating a method of determining error model parameters according to an embodiment of the present invention. Specifically, a database generated by this the method illustrated in FIG. 5 contains error model parameters for a plurality of areas and/or sub-areas and may be used to store error model parameters for a set spatial area.

Referring to FIG. 5, in step 502, location signals are received for the spatial area, similar to steps 202 and 302 in FIGS. 2 and 3.

In step 504, the received signals are distributed into sets based on characteristics of the signals, e.g., using known unsupervised learning techniques such as clustering. The characteristics of the signals may include at least satellite elevation angle and SNR for one or more satellites.

In step 506, a reference signal is selected from a group. For example, a reference signal may be selected as a signal with the most frequently occurring characteristics (i.e., the mode of the group).

In step 508, the selected reference signal is subtracted from other signals within the group to obtain statistical measurements. In step 510 these statistical measurements are used to compute error parameter values for the error model in the particular area. Error parameter values for particular groups of location signal characteristics may be calculated.

In step 512, one or more error parameter values for the present area and/or time are recorded in the database, when sufficient statistics are accumulated. For example, the database may be the same database used in step 306 of FIG. 3.

In a simplified case, assuming three groups based on a SNR value, i.e., good, average, and poor, each group may have an associated range of SNR values, e.g., based on a clustering technique, as discussed above. One or more error model parameter values may be calculated for each group. For example, certain error parameters may be more dependent on SNR, whereas other error parameters may be more or less independent of the SNR level. Error model parameters that are dependent on SNR may have different values for the parameters for each group. In these cases, a receiving device may transmit a SNR value along with an initial location and/or time, e.g., as illustrated in steps 306 and 308 of FIG. 3, and in which case a error model parameter value for a group into which the transmitted SNR value falls may be determined.

In other cases, groups of signal characteristics may be calculated for a particular area. The group with the largest number of exemplary signals from experiments in that area (e.g., from data retrieved in step 502) may be taken as exemplary for the area, e.g., an SNR group of 'good'. As such, when a new receiving device requests error model parameters for the area, the area is assigned the SNR group of 'good' and one or more error model parameter values that are typical of received signals classified as 'good' are sent to the receiving device. Each signal characteristic group may require a certain number of recorded signals that fall within the group before error model parameters for the group are calculated. For example, in certain implementations, if no signal of a characteristic group occurs during measurement, this measurement is then not taken into account.

Figure 6:
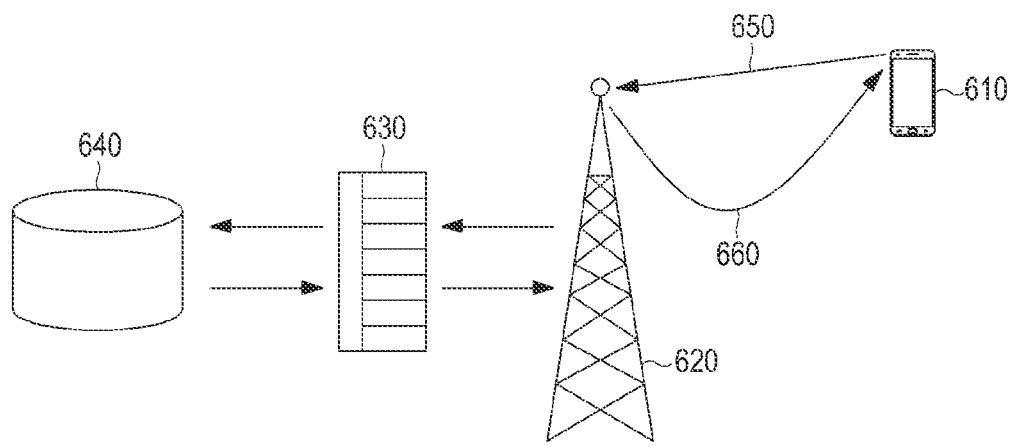
FIG. 6 illustrates a method of obtaining error model parameters according to an embodiment of the present invention.

FIG. 6 illustrates a method of obtaining error model parameters according to an embodiment of the present invention. Specifically, FIG. 6 illustrates a possible implementation procedure for obtaining error model parameter values that may be used with any of the other described embodiments.

Referring to FIG. 6, a mobile telephone 610 includes a receiving device for a location system, e.g., a GPS receiver, and a base-station 620, which may be any form of base-station for wireless communication, such as Global System for Mobile Communications (GSM), Code Division Multiple Access (CDMA), a CDMA derivative, any standard within the Institute of Electrical and Electronic Engineers (IEEE) 802.16 and 802.11 families, 3rd Generation Partnership Project's Long Term Evolution (3GPP LTE), etc., is coupled to a communications network that, among other devices, which are not illustrated, includes a server 630 and an auxiliary database 640. The server 630 is coupled to the base-station 620 and the auxiliary database 640, for example, through the communications network.

A user transmits a request 650 to the base-station 620 to retrieve error model parameter values. For example, these error model parameter values may be at least one of known parameters, $\lambda_i$, $\lambda_j$, m, and $\sigma^2$. The error model parameter values may be dependent on the current location and/or time of request.

A preliminary coordinate estimate may be either transmitted in the request 650 following a coarse location determination on mobile telephone 610 or computed on the server 630 using cellular network data. In any case, the request is then processed on the server 630 using an auxiliary database 640. The auxiliary database 640 contains error model parameter values. If the values are area and/or time dependent the server 630 retrieves the appropriate parameter values using area and/or time values from either the mobile telephone 610 or server calculations. The server 630 then returns a response 660 to the mobile telephone 610 including the appropriate error model parameter values for the area and/or time, so that mobile telephone 610 may calculate an accurate location estimate using the error model and maximum likelihood methods described above.

In some embodiments, the server 630 may perform the maximum likelihood calculation and return the revised location estimate to the mobile telephone 610. The response 660 may be transmitted back to the mobile telephone together with auxiliary cellular data to the user.

Alternatively, the server 630 may return the present area of a mobile telephone 610 based on cellular network data. In this case, another database may supply the values for the error model parameters or these may be stored locally on the mobile telephone 610.

The values for the error model parameters stored in the auxiliary database 640 can be formed using pseudorange measurements from multiple users located within a given area. For example, these measurements may be transmitted to a network system server, such as server 630, where they may be analyzed and processed to determine error model parameter values. These results are saved in the auxiliary database 640.

Figure 7A:
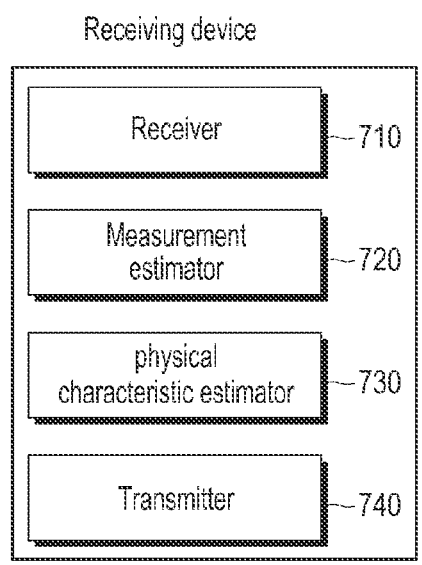
FIG. 7A illustrates a receiving device for use in a navigation system according to an embodiment of the present invention.

FIG. 7A illustrates receiving device for use in a navigation system according to an embodiment of the present invention.

Referring to FIG. 7A, the receiving device comprises a receiver 710, a measurement estimator 720, a physical characteristic estimator 730, and a transmitter 740.

The receiver 710 receives a plurality of navigation signals from a plurality of navigation signal sources, respectively. The measurement estimator 720 determines a plurality of measurement estimates based on the received navigation signals.

The physical characteristic estimator 730 determines a physical characteristic of the receiving device. More specifically, the physical characteristic estimator 730 estimates a first set of one or more parameters in an error model based on at least the plurality of measurement estimates. The error model includes a first error contribution for modeling noise and a second error contribution for modeling indirect signal propagation of the plurality of navigation signals.

The first error contribution includes a Gaussian distribution and the second error contribution includes an exponential distribution. The physical characteristic includes one of position, velocity and time information for the receiving device.

The measurement estimates include at least one of pseudo range estimates and pseudo doppler estimates.

The error model includes a function of at least the first set of parameters, the plurality of measurement estimates, and location coordinates for each of the plurality of navigation signal sources.

The error model also includes a function of a second set of one or more pre-determined parameters, and the receiver obtains the second set of one or more pre-determined parameters.

The physical characteristic estimator 730 determines a preliminary location estimate based on at least the measurement estimates and location coordinates for each of the plurality of navigation signal sources. The transmitter 740 transmits at least the preliminary location estimate to obtain the second set of the one or more pre-determined parameters from a remote database. The second set of the one or more pre-determined parameters is dependent on at least the preliminary location.

The transmitter 740 transmits at least the preliminary location estimate and a current location time to obtain a location and time specific set of pre-determined parameters.

The second set of pre-determined parameters include at least a mean value and a variance value for a Gaussian distribution and one or more parameters defining an exponential distribution.

The physical characteristic estimator 730 determines a preliminary location estimate using a least mean squares computation, and determines the physical characteristic of the receiving device by computing values for the first set of the one or more parameters that maximize a likelihood of at least the plurality of measurement estimates and location coordinates for each of the plurality of navigation signal sources.

The first set of parameters includes one or more of at least a two-dimensional co-ordinate for the receiving device and a clock bias for the receiving device, and the second error contribution includes an exponential distribution with two parameters that model an error difference between at least two navigation signal sources.

Figure 7B:
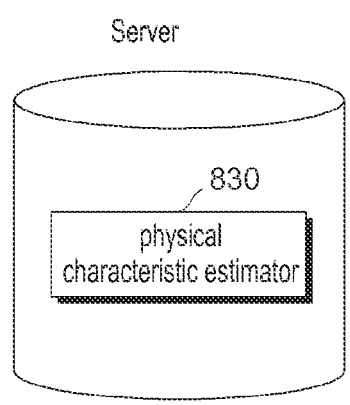
FIG. 7B illustrates a server for use in a navigation system according to an embodiment of the present invention.

FIG. 7B illustrates a server for use in a navigation system according to an embodiment of the present invention.

Referring to FIG. 7B, the server includes a physical characteristic estimator 830 for determining the physical characteristic of the receiving device by estimating a first set of one or more parameters in an error model, based on at least a plurality of measurements estimated from navigation signals from a plurality of navigation signal sources. The error model includes a first error contribution for modeling noise and a second error contribution for modeling indirect signal propagation of the plurality of navigation signals.

Certain embodiments described herein for improving positioning accuracy in severe environments can be used in most telecommunication systems applying range-measurement and range-difference location. For example, there may be used in satellite communication systems such as GPS, GLONASS, Galileo, etc.; ground navigation systems such as Loran, Chaika, etc.; cellular communication systems such as GSM, CDMA, etc., which use a receiving device for location; and other radio communication systems employed to locate a receiving device such as WiFi, LTE, Wi-Max, etc.

Certain embodiments described herein can be adapted to estimate any physical characteristic of a receiving device derivable from the navigation signals. For example, any one of PVT information may be determined individually be using an error model with an error contribution modeling indirect signal propagation or multipath effects. The error model may also incorporate derived calculations, and as such may be expanded to calculate values such as acceleration. When calculating a velocity estimate, pseudodoppler values are used in place of pseudorange values. Both position and velocity calculation procedures include estimation of new error distributions to improve accuracy since using a Gaussian distribution is no longer optimum in many urban environments. The parameters required to describe each error model (e.g., a position error model and a velocity error model) may be different but both involve the application of an error contribution to model indirect signal propagation or multipath effects.

Certain embodiments described herein allow for improved telecommunication system signal delay measurement accuracy in severe reception environments. This is achieved by the use of a complex pseudo-range measurement error pattern that is a sum of a Gaussian error and an error taking into account indirect signal propagation. According to the experiments, the error pattern can be an error distributed by the exponential rule. The approach provides significant improvements for user coordinate location by a single measurement and has high stability in weak signal reception environments, for example as compared with conventional methods for receiving device or mobile station location calculation.

In certain cases, a computer program product, for example a product including a non-transitory computer-readable storage medium having computer readable instructions stored thereon, may be used to implement at least a portion of the described examples. In this case, the computer readable instructions are executable by a computerized device to cause the computerized device to perform a method for determining one or more physical characteristics of a receiving device, as described above.

The above embodiments are to be understood as illustrative examples of the invention. Further embodiments of the invention are envisaged. For example, the exact nature of the pseudorange calculations may vary based on the implementation and more advanced corrections may additions be incorporated into the described method. Reference to maximizing a function may also be taken to apply to minimizing an inverted version of the function. Reference to a receiving device applies to any device capable of using and processing location system signals, such as mobile stations in GNSS. In certain implementations simplifications and/or approximations may be made to the model to increase speed and/or reducing processing demand. For example, a three dimensional location may be reduced to a two dimensional location. Alternatively, the clock bias may be assumed to have a value or may be obtained or estimated by other means, such as a direct measurement on the receiving device.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of determining a physical characteristic of a receiving device in a navigation system, the method comprising:
   receiving a plurality of navigation signals from a plurality of navigation signal sources, respectively;
   determining a plurality of measurement estimates corresponding to the plurality of navigation signal sources, based on the received plurality of navigation signals;
   determining a physical characteristic of the receiving device by estimating a first set of one or more parameters in an error model, based on at least the plurality of measurement estimates; and
   calculating a position of the receiving device by using the physical characteristic,
   wherein the error model includes a first error contribution for modeling noise and a second error contribution for modeling indirect signal propagation of the plurality of navigation signals.

2. The method of claim 1, wherein the first error contribution includes a Gaussian distribution.

3. The method of claim 1, wherein the second error contribution includes an exponential distribution.

4. The method of claim 1, wherein the physical characteristic includes one of velocity and time information for the receiving device.

5. The method of claim 1, wherein the measurement estimates include at least one of pseudorange estimates and pseudodoppler estimates.

6. The method of claim 1, wherein the error model further includes a function of at least the first set of one or more parameters, the plurality of measurement estimates, and location coordinates for each of the plurality of navigation signal sources.

7. The method of claim 1, wherein the error model further includes a function of a second set of one or more pre-determined parameters, and
   wherein the method further comprises obtaining the second set of the one or more pre-determined parameters.

8. The method of claim 7, wherein obtaining the second set of the one or more pre-determined parameters comprises:
   determining a preliminary location estimate based on at least the measurement estimates and location coordinates for each of the plurality of navigation signal sources; and
   using at least the preliminary location estimate to determine the second set of the one or more pre-determined parameters,
   wherein the second set of the one or more pre-determined parameters is dependent on at least the preliminary location.

9. The method of claim 8, wherein using at least the preliminary location estimate to determine the second set of the one or more pre-determined parameters comprises using at least the preliminary location estimate and a current location time to retrieve a location and time specific set of pre-determined parameters.

10. The method of claim 8, wherein the second set of the one or more pre-determined parameters include at least a mean value and a variance value for a Gaussian distribution and one or more parameters defining an exponential distribution.

11. The method of claim 8, wherein the preliminary location estimate is used to determine exemplary navigation signal characteristics, and
wherein the exemplary navigation signal characteristics are used to determine the second set of the one or more pre-determined parameters.

12. The method of claim 8, wherein a least mean squares method is used to determine the preliminary location estimate.

13. The method of claim 1, wherein determining the one or more physical characteristics of the receiving device comprises determining values for the first set of the one or more parameters that maximize a likelihood of at least the plurality of measurement estimates and data relating to the plurality of navigation signal sources.

14. The method of claim 1, wherein the first set of the one or more parameters includes one or more of at least a two-dimensional co-ordinate for the receiving device and a clock bias for the receiving device.

15. The method of claim 1, wherein the second error contribution includes an exponential distribution with two parameters that model an error difference between at least two navigation signal sources.

16. A receiving device for use in a navigation system, the receiving device comprising:
a receiver for receiving a plurality of navigation signals from a plurality of navigation signal sources, respectively;
a measurement estimator for determining a plurality of measurement estimates corresponding to the plurality of navigation signal sources, based on the received plurality of navigation signals; and
a physical characteristic estimator for determining a physical characteristic of the receiving device and calculating a position of the receiving device by using the physical characteristic,
wherein the physical characteristic estimator estimates a first set of one or more parameters in an error model based on at least the plurality of measurement estimates, and
wherein the error model includes a first error contribution for modeling noise and a second error contribution for modeling indirect signal propagation of the plurality of navigation signals.

17. The receiving device of claim 16, wherein the first error contribution comprises a Gaussian distribution.

18. The receiving device of claim 16, wherein the second error contribution comprises an exponential distribution.

19. The receiving device of claim 16, wherein the physical characteristic comprises one of velocity and time information for the receiving device.

20. The receiving device of claim 16, wherein the measurement estimates comprise at least one of pseudo range estimates and pseudo doppler estimates.

21. The receiving device of claim 16, wherein the error model comprises a function of at least the first set of parameters, the plurality of measurement estimates, and location coordinates for each of the plurality of navigation signal sources.

22. The receiving device of claim 16, wherein the error model comprises a function of a second set of one or more pre-determined parameters, and
wherein the receiver obtains the second set of one or more pre-determined parameters.

23. The receiving device of claim 16, wherein physical characteristic estimator determines a preliminary location estimate based on at least the measurement estimates and location coordinates for each of the plurality of navigation signal sources, and
wherein the receiving device further comprises a transmitter for transmitting at least the preliminary location estimate to obtain the second set of the one or more pre-determined parameters from a remote database, and
wherein the second set of the one or more pre-determined parameters is dependent on at least the preliminary location.

24. The receiving device of claim 23, wherein the transmitter transmits at least the preliminary location estimate and a current location time to obtain a location and time specific set of pre-determined parameters.

25. The receiving device of claim 23, wherein the second set of pre-determined parameters comprise at least a mean value and a variance value for a Gaussian distribution and one or more parameters defining an exponential distribution.

26. The receiving device of claim 23, wherein the physical characteristic estimator determines a preliminary location estimate using a least mean squares computation.

27. The receiving device of claim 16, wherein the physical characteristic estimator determines the physical characteristic of the receiving device by computing values for the first set of the one or more parameters that maximize a likelihood of at least the plurality of measurement estimates and location coordinates for each of the plurality of navigation signal sources.

28. The receiving device of claim 16, wherein the first set of parameters comprises one or more of at least a two-dimensional co-ordinate for the receiving device and a clock bias for the receiving device.

29. The receiving device of claim 16, wherein the second error contribution comprises an exponential distribution with two parameters that model an error difference between at least two navigation signal sources.

30. A server for determining a physical characteristic of a receiving device, the server comprising:
a physical characteristic estimator for determining the physical characteristic of the receiving device by estimating a first set of one or more parameters in an error model, based on at least a plurality of measurements estimated from navigation signals from a plurality of navigation signal sources and calculating a position of the receiving device by using the physical characteristic,
wherein the error model includes a first error contribution for modeling noise and a second error contribution for modeling indirect signal propagation of the plurality of navigation signals.

* * * * *